Figure 13:
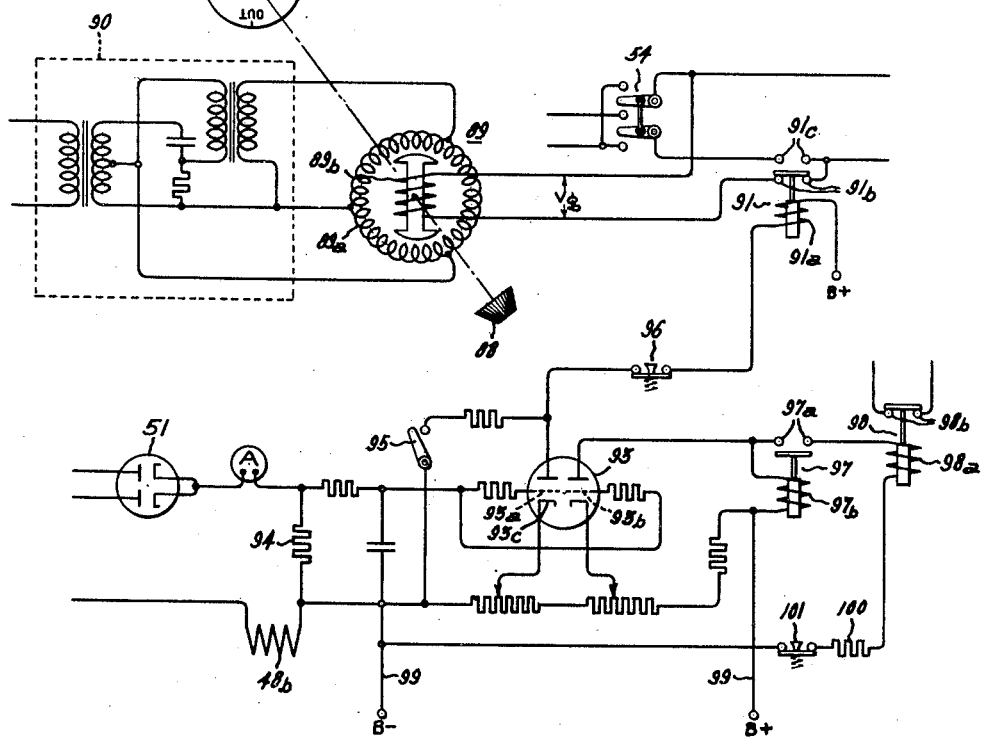

Dec. 27, 1949          N. G. BRANSON          2,492,731
TRACER CONTROL SYSTEM
Filed Aug. 14, 1944          5 Sheets-Sheet 1
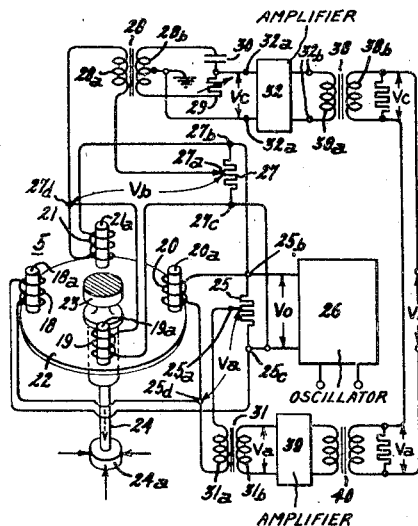
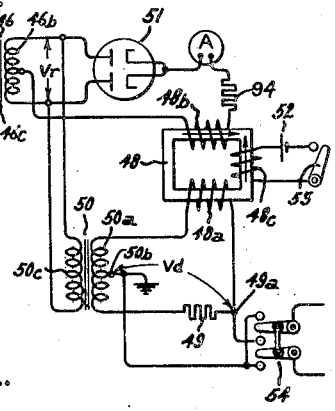
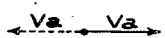
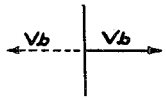
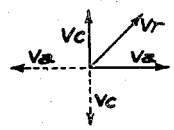
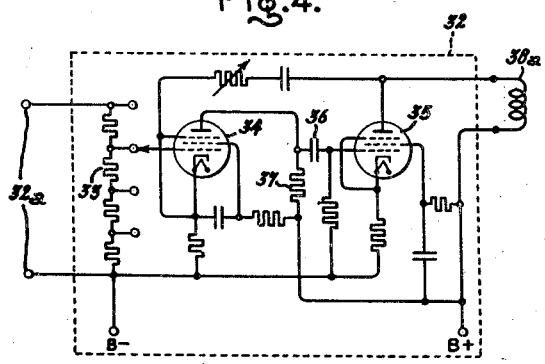
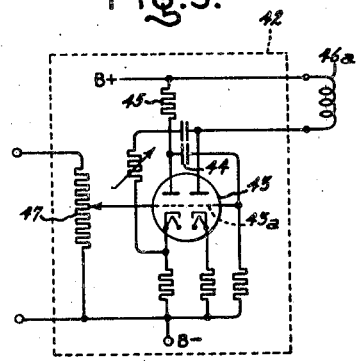
Inventor:
Norman G. Branson,
by Harry E. Dunham
His Attorney.

Dec. 27, 1949 N. G. BRANSON 2,492,731
TRACER CONTROL SYSTEM
Filed Aug. 14, 1944 5 Sheets-Sheet 2
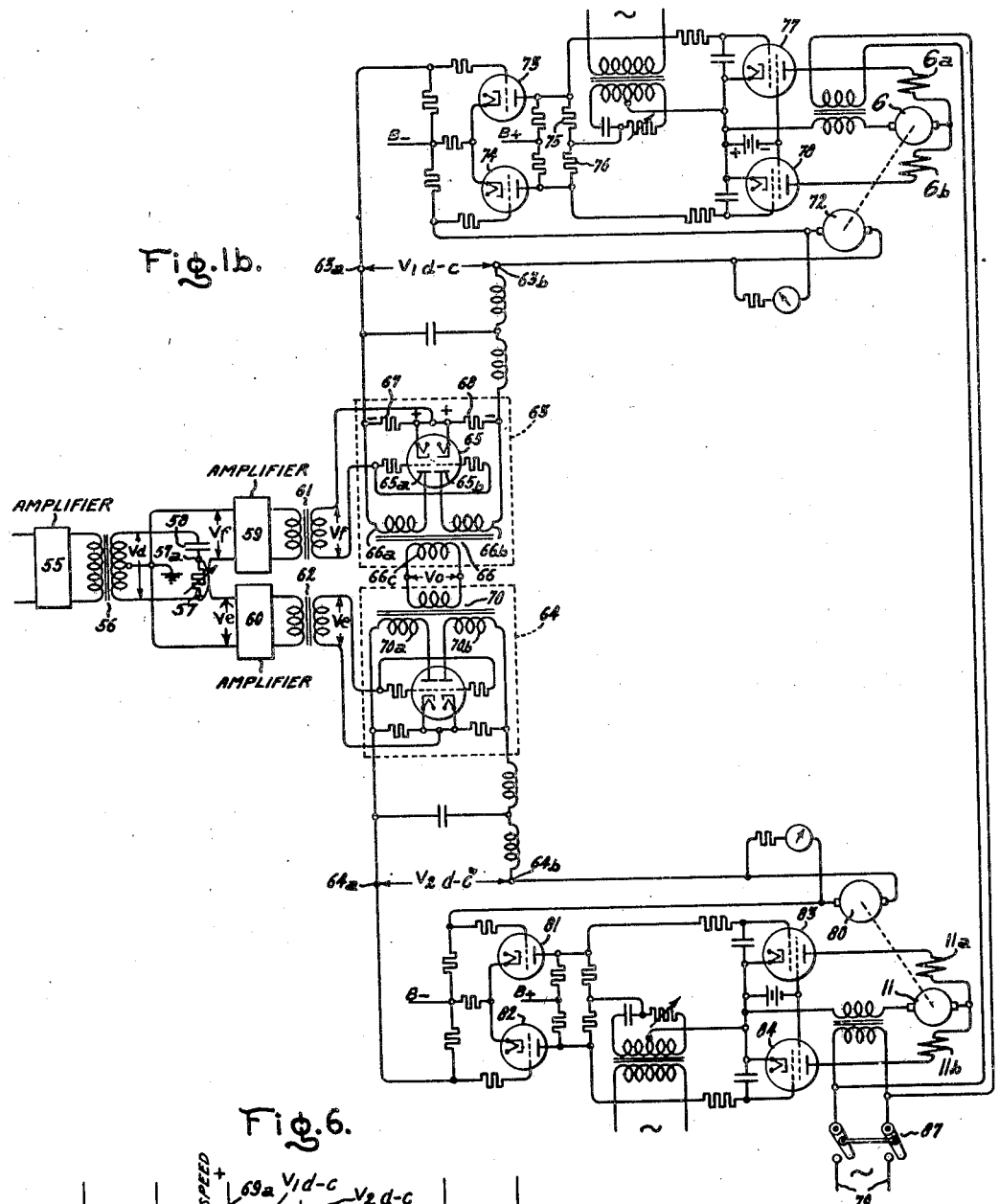
Fig. 1b.
Fig. 6.
PHASE OF Vd WITH RESPECT TO Vo
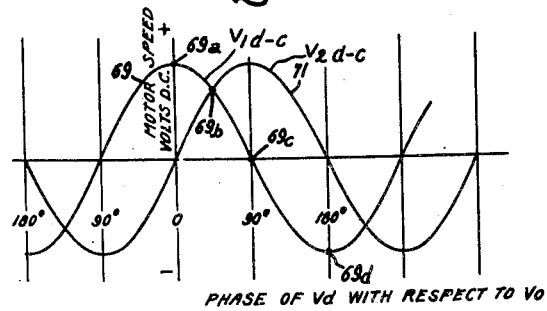
Inventor:
Norman G. Branson,
by Harry E. Dunham
His Attorney.

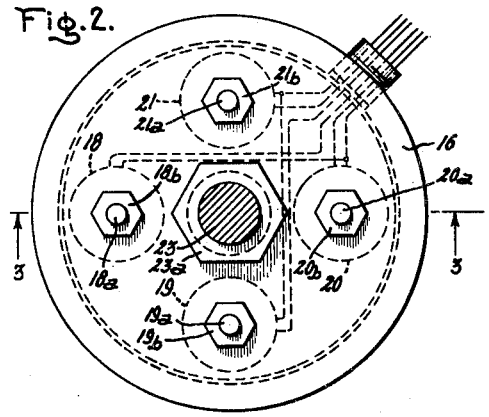

Fig.9.

Dec. 27, 1949    N. G. BRANSON    2,492,731
TRACER CONTROL SYSTEM
Filed Aug. 14, 1944    5 Sheets-Sheet 5

Inventor:
Norman G. Branson,
by Harry E. Dunham
His Attorney.

Patented Dec. 27, 1949

2,492,731

UNITED STATES PATENT OFFICE 2,492,731

TRACER CONTROL SYSTEM

Norman G. Branson, Schenectady, N. Y., assignor to General Electric Company, a corporation of New York Application August 14, 1944, Serial No. 549,391

13 Claims. (Cl. 318—39)

This invention relates to electric control systems, more particularly to electric tracer control systems for automatic pattern controlled machine tools, and it has for an object the provision of a simple, reliable and improved control system of this character.

More specifically, the invention relates to electric tracer control systems for machine tools which in operation are frequently required to make repeated cuts on a work piece throughout 360 degrees of a closed path. Accordingly, a more specific object of the invention is the provision of an electric tracer control system which controls the tracer element to trace the outline of a pattern throughout the 360 degrees of a closed path at constant deflection of the tracer element and to repeat this tracing operation any number of times at constant deflection of the tracer element.

An advantage of the invention is that each of the successive cuts is a true reproduction of the pattern throughout the 360 degrees of its outline.

This invention constitutes an improvement of the tracer control system described in application Serial No. 472,840, Hans P. Kuehni et al., filed January 13, 1943, now Patent Number 2,410,295, issued Oct. 29, 1946, continuation-in-part application Serial No. 486,046, filed May 7, 1943, now Patent Number 2,388,555, issued Nov. 6, 1945, and assigned to the same assignee.

In carrying the invention into effect in one form thereof, a source of reference alternating voltage is provided. A movable tracer element produces a control alternating voltage in response to deflection of the tracer element from a predetermined initial position as a result of contact with the pattern. Suitable driving means is provided for effecting relative movement of the tracer element and pattern in any direction in a plane. This control voltage has a phase relationship with respect to the reference voltage which is dependent on the direction of the deflection of the tracer element, and its magnitude is dependent upon the magnitude of the deflection. This control alternating voltage is supplied to a device which produces a dephased alternating voltage having a phase displacement with respect to the control voltage that varies with the magnitude of the control voltage. Means responsive to this dephased voltage are provided for controlling the driving means to effect relative motion of the tracer element in a direction corresponding to the phase displacement between dephased voltage and the reference voltage. In one specific embodiment of the invention, the means which controls the driving means takes the form of electronic circuit apparatus which produces two direct voltages varying in magnitude and polarity as the cosine and sine respectively of the phase displacement angle between the dephased voltage and the reference voltage.

For a better and more complete understanding of the invention, reference should now be made to the following specification and to the accompanying drawings of which Fig. 1a, 1b is a simple schematic sketch of an embodiment of the invention, Fig. 2 is a plan view of the tracer element which constitutes a detail of the invention, Fig. 3 is a sectional view of the tracer element taken on line 3—3 of Fig. 2, Fig. 4 is a simple schematic diagram of an electronic type amplifier circuit of which several are used in the complete system for suitably amplifying certain of the control voltages, Fig. 5 is a simple schematic diagram of a slightly modified electronic type amplifier of which a number are used in the system, Fig. 6 is a chart of characteristic curves which facilitate an understanding of the operation, Fig. 7 is a vector diagram of the forces acting on the tracer finger and resulting directions of relative movement of the tracer and the pattern in tracing an inside circular pattern, Fig. 8 is a view in perspective of the main parts of a milling machine illustrating an application of the invention to a machine tool, Fig. 9 is a table of vectors and values of characteristics, control voltages and phase relationships which serve to facilitate an understanding of the operation of the invention, Figs. 10, 11 and 12 are vector diagrams which serve to facilitate an understanding of the operation of sub-combinations of the main system, and Fig. 13 is a simple diagrammatic sketch of an accessory for providing manual control of the system.

Referring now to the drawing and particularly to Fig. 8, a work piece 1 and a pattern 2 are securely clamped to the table 3 of a milling machine. The work piece 1 is to be milled by the milling cutter 4 under the control of the tracer element 5 so that its profile conforms accurately to the profile of the pattern 2. To provide for longitudinal movement in either direction, the table 3 is slidably mounted in ways (not shown) and is driven by any suitable driving means such as a reversible D.-C. electric motor 6 to the drive shaft of which the table is connected by means of a nut 7, lead screw 8 and gearing 9. The tracer 5 and the milling cutter 4 are mounted on a head 10 which is slidably mounted in ways (not shown) for transverse movement in either direction at right angles to the longitudinal movement of the table. For this transverse movement the head is driven by any suitable driving means such as a reversibe D.-C. motor 11 of which the drive shaft is connected to the head by means of gearing 12, a lead screw 13 and cooperating nut 14.

The mounting of the tracer 5 on the head 10 is adjustable so that the distance between the tracer and the milling cutter can be adjusted as desired.

A preferred construction of the tracer is illustrated in Figs. 2 and 3. It comprises an outer cylindrical shell 15, a top cover plate 16 and a bottom plate 17. Four reactance coils 18, 19, 20 and 21 wound on spools made of suitable insulating material are fastened to the cover plate 16 by means of core members 18a, 19a, 20a and 21a which are threaded into the cover plate and secured by nuts 18b, 19b, 20b and 21b respectively. These reactance coils are spaced in quadrature relationship as illustrated in Fig. 2. A circular shaped armature member 22 is mounted on a centrally disposed supporting member 23 within the casing in spaced relationship with the core members so as to provide substantially equal air gaps between the armature and the lower ends of the core members. The supporting member 23 projects through centrally disposed openings in both the cover plate 16 and the bottom plate 17. As shown, the supporting member is provided with a shoulder which is clamped tightly against the cover plate by means of a nut 23a. The lower end of the supporting member is drilled to receive a tracer element 24 which is held in place by means of a set screw. A narrow neck portion 23b is formed in the supporting member 23 to provide for deflection of the lower end in any radial direction in a plane in response to the application of force to the tracer element. Since the armature member 22 is mounted on the supporting member 23 below the neck portion 23b, any deflection of the tracer element 24 from its initial undeflected position will produce a corresponding movement of the armature with respect to the core members 18a, 18b, 18c and 18d. The inside diameter of the opening 17a in the bottom plate 17 is sufficiently large to permit such limited deflection of the lower end of the supporting member. The shell 15, top plate 16, bottom plate 17, core members 18 to 21 inclusive, and armature 22 may be made of any suitable magnetic material having a high degree of magnetic permeability such as a mild cold rolled steel or a nickel-iron alloy such as the alloy sold on the market under the trade-mark "Permalloy." The supporting member 23 is preferably made of a high grade steel having good elastic properties.

As thus constructed, the tracer head constitutes a magnetic circuit which includes the central supporting member 23, the cover plate 16, the core members 18a to 21a inclusive in parallel, the armature 22 and the air gaps between each core member and the armature member 22. The core members are mounted separately and adjusted by means of the nuts 18b, 19b, 20b and 21b. The pair of diametrically opposite reactance coils 18 and 20 are connected as adjacent arms of a bridge circuit of which the portions of an adjustable resistor 25 on opposite sides of the slider constitute the other two arms. An alternating voltage $V_0$ is supplied to the opposite bridge points 25b and 25c. This alternating voltage may have any suitable frequency, e. g., a frequency of 4000 cycles per second and is supplied from a suitable source such as the electric valve type oscillator 26 which is illustrated conventionally in the drawing. The alternating voltage $V_0$ is referred to in the specification and claims as the reference voltage. When the reactances of the coils 18 and 20 are equal and the portions of the resistor 25 on opposite sides of the slider 25a are equal, the bridge circuit is balanced.

Similarly, the two coils 19 and 21 are connected as adjacent arms of a second bridge circuit of which the portions of the resistor 27 on opposite sides of the slider 27a constitute the other two arms. Opposite bridge points 27b and 27c are supplied with an alternating voltage which is preferably the alternating voltage $V_0$ which is supplied to the bridge points 25b and 25c.

The reactance of the coils 18 and 20 varies inversely with the length of the air gaps between the cores 18a and 20a and the armature 22. That is to say, if the air gap between core 18a and armature 22 is decreased, the reactance of the coil 18 is increased and conversely if the air gap is increased, the reactance of the coil is correspondingly decreased. With the tracer element 24 in its central undeflected position, the two bridges can be balanced by adjusting the nuts 18b, 19b, 20b and 21b to vary the air gaps and by varying the positions of the sliders 25a and 27a. Preferably, the coarse adjustments are made by adjustment of the air gaps and the fine or vernier adjustments are made by adjusting the sliders 25a and 27a.

When the bridge, which includes the coils 18 and 20, is balanced the voltage at the output terminals 25a and 25d is zero. If the tracer element is deflected from its central undeflected position toward the left, the armature 22 is deflected in such a direction as to increase the air gap between the core 20a and the armature and to decrease the air gap betwen the core 18a and the armature. This results in unbalancing the bridge so that an altenating voltage $V_a$ appears at the output terminals 25a and 25d. This voltage is represented in phase and magnitude by the full line vector $V_a$, Fig. 10. The magnitude is, of course, proportional to the deflection of the tracer element.

A deflection of the tracer element in the opposite direction produces an opposite unbalance of the bridge with the result that the output voltage $V_a$ is reversed in phase as illustrated by the dotted line vector in Fig. 10.

If the tracer element is deflected toward the front, i. e., toward the reader, the armature 22 is correspondingly deflected in a direction such as to decrease the air gap between the core 19a and the armature and to increase the air gap between the core 21a and the armature. This produces an unbalance of the bridge and an alternating voltage $V_b$ appears across the output terminals 27a and 27d. The phase and magnitude of the voltage $V_b$ are represented by the full line vector in Fig. 11. The magnitude is proportional to the deflection. Similarly, an opposite deflection of the tracer, i. e., a deflection away from the reader produces an opposite unbalance of the bridge with the result that the voltage $V_b$ is reversed in phase as indicated by the dotted line vector of Fig. 11.

A deflection in any other direction in the plane may be resolved into components at right angles to each other, of which one produces the voltage $V_a$ and the other produces simultaneously the voltage $V_b$. The voltage $V_b$ is supplied to the terminals of the primary winding 28a of a transformer 28 of which the center tapped secondary winding 28b is connected to a phase shifting circuit comprising an adjustable resistor 29 and a capacitor 30 connected in series relationship with each other. An alternating voltage Vc appears between the center tap of the secondary winding and the common connection of the resistor and the capacitor. This voltage Vc is displaced in phase 90 degrees with respect to the voltage Va as represented by the solid line vertical vector in Fig. 12.

The voltage Va is supplied to the primary winding 31a of a transformer 31. The voltage of the secondary winding is not supplied to a phase shifting network and is therefore represented in Fig. 12 by the full line and dotted line vectors Va which have the same phase as the vector Va of Fig. 10.

The voltage Vc is amplified by means of a suitable electric valve type amplifier 32. In Fig. 1a, this amplifier is illustrated conventionally for the purpose of simplifying the figure. However, the circuit details of this amplifier are illustrated in Fig. 4. As shown in Fig. 4, the amplifier 32 is an electric valve type two-stage resistance-capacitance coupled alternating voltage amplifier with transformer output and negative feed back from the output of the second stage to the input of the first stage for stabilizing the valve circuits. The voltage Vc is supplied to the input terminals 32a across which a voltage divider 33 is connected. A selectable amount of the voltage Vc is supplied between the cathode and control grid of a screen grid valve 34 which constitutes the first stage of the amplifier. The second stage comprises a screen grid valve 35 of which the control grid is connected through a coupling capacitor 36 to the anode of the first stage valve so as to be responsive to variations in the voltage drop across the anode circuit resistor 37. The primary winding 38a of the output transformer 38 is connected in the anode circuit of the secondary stage valve. The amplification factor of this amplifier is approximately 200 to 1. The amplified alternating voltage Vc appears across the terminals of the secondary winding 38b. The voltage Va is also amplified by a suitable alternating voltage amplifier 39 which may be and preferably is identical with the amplifier 32. The amplified voltage Va appears across the terminals of the secondary winding of the output transformer 40.

Instead of providing a phase shifting circuit for shifting the phase of the voltage Vb 90 degrees with respect to the voltage Va, the two bridge circuits of the tracer head 5 may be supplied from two separate oscillators, each similar to the oscillator 26, which produce alternating voltages displaced 90 degrees in phase from each other.

For the purpose of combining the two quadrature component voltages Va and Vc into a single resultant alternating voltage Vr, the secondary windings of the transformers 38 and 40 are connected in series relationship with each other. The magnitude of the resultant voltage Vr is proportional to the magnitude of deflection of the tracer element which produces the component voltages Va and Vc, and its phase corresponds to the direction of the displacement. In other words, as the direction of displacement is varied through 360 degrees, the phase of the resultant voltage Vr is correspondingly shifted through 360 degrees. This is indicated in the table of Fig. 9 in which the values tabulated in the left hand column entitled "F-amplitude" represent either the magnitude of the deflection of the tracer element or the magnitude of the force applied to the tracer element. It may be assumed that a deflection of 1.0 unit in the table represents an actual deflection of the tracer element of .001". The direction of the deflection or the direction of the force which produces such deflection is represented by the direction of the vectors in the second column under the heading "F-direction." The magnitude of the vectors in this column are proportional to the corresponding deflections tabulated in the first column. The corresponding magnitudes and polarities of the component voltages Va and Vc are represented by the magnitudes and directions of the vectors tabulated in the third and fourth columns under the headings Va and Vc respectively. The corresponding magnitudes and phase displacements of the resultant voltage Vr are represented by the magnitudes and phase displacements of the vectors in the fifth column under the heading Vr. It will be noted that the magnitude of the voltage Vr is proportional to the magnitude of the corresponding deflection in the first column. It will also be noted that for each different direction of the deflection F in the second column, there is a corresponding phase displacement of the resultant voltage Vr.

The resultant voltage Vr is supplied to the terminals 41a of a suitable band pass filter 41. This filter removes the harmonic voltages which are introduced by the iron in the tracer gauge head 5 and also removes the imperfections in the sine wave of the voltage supplied to the tracer head from the oscillator 26.

For the purpose of amplifying the resultant voltage Vr, a suitable A.-C. electric valve type amplifier 42 is provided. As shown in Fig. 5, the amplifier 42 is a two-stage amplifier with resistance-reactance coupling between the stages and transformer output. It comprises a twin triode electric valve 43 of which the left-hand path constitutes the first stage and the right hand path constitutes the second stage. The control grid 43a of the right hand path is coupled to the anode circuit of the left hand path by means of a coupling capacitor 44 so as to be responsive to changes in the voltage drop across the resistor 45 in the anode circuit of the first stage. The primary winding 46a of the output transformer 46 is connected in the anode circuit of the second stage. The filtered resultant voltage Vr is supplied to the input potentiometer 47 and a selected portion of the voltage Vr is supplied between the grid and cathode of the first stage. The amplified voltage Vr appears across the terminals of the secondary winding 46b of the output transformer.

In order that the tracer element may trace around the outline of the pattern at constant deflection, means are provided for effecting relative movement of the tracer and pattern at right angles to the direction of the deflection at a predetermined constant value of deflection and for effecting a small component of relative movement of the tracer and pattern away from each other when the deflection exceeds a predetermined value or toward each other when the deflection is less than the predetermined value. This is accomplished by deriving from the voltage Vr a dephased alternating voltage Vd of which the phase displacement with respect to the resultant voltage Vr is proportional to the magnitude of the resultant voltage. The means for deriving the dephased voltage Vd is illustrated as a phase shifting bridge circuit comprising a reactance winding 48a of a saturable core reactor 48 and the resistance 49 connected as two adjacent arms of the bridge. The portions of the secondary winding 50a of transformer 50 on the opposite sides of the center tap 50b are the other two arms. The primary winding 50c is connected across the secondary winding 46b of the output transformer so that the amplified resultant voltage $V_r$ is supplied across the reactance winding 48a and resistance 49 and the dephased alternating voltage $V_d$ appears across the output terminals 50b and 49a of the bridge. The saturation control winding 48b of the reactor is excited by means of a direct current obtained from the secondary winding 43b through a full wave electric valve type rectifier 51. The reactance of a saturable core reactor varies in inverse relationship to the saturation of its core, i. e., when the saturation is maximum, the reactance is minimum and when the saturation is minimum the reactance is maximum. For intermediate values of saturation, there are corresponding intermediate values of reactance, but the relationship is not linear. When the reactance of the reactance winding 48a is maximum, the voltage $V_d$, which appears across the output terminals 49a and 50b of the phase shifting bridge, is substantially in phase with the resultant voltage $V_r$. Likewise, when the reactance is minimum, the voltage $V_d$ has a maximum leading phase displacement with respect to the resultant voltage $V_r$. For intermediate values of reactance of the reactance winding, the dephased voltage $V_d$ has corresponding intermediate leading phase displacements with respect to the resultant voltage $V_r$. Thus for small deflections of the tracer element, the resultant voltage $V_r$ is correspondingly small and the dephased voltage $V_d$ is substantially in phase with the resultant voltage $V_r$. For larger deflections of the tracer element, the magnitude of the resultant voltage $V_r$ and the phase displacement between the voltage $V_r$ and the dephased voltage $V_d$ are correspondingly larger. Stated in other words, the phase displacement of the dephased voltage $V_d$ with respect to the resultant voltage $V_r$ becomes increasingly leading in response to increasing deflection of the tracer element and therefore in response to increasing magnitude of the resultant voltage $V_r$. Thus, as shown in the first three horizontal rows of the table of Fig. 9, for deflections to the left of .5 unit, 1.5 units and 1.0 unit, the resultant voltage $V_r$ and the dephased voltage $V_d$ have corresponding magnitudes of .5 unit, 1.5 units and 1.0 unit respectively. For these same deflections the voltage $V_d$ has corresponding leading phase displacements with respect to the resultant voltage $V_r$ and also with respect to the reference voltage $V_0$ of 45°, 135° and 90° respectively. If during the tracing operation the deflection is assumed to be substantially constant at 1.0 unit, the voltage $V_d$ will have a 90° leading phase displacement with respect to the resultant voltage $V_r$ as indicated by the corresponding tabulations of the vectors $V_r$ and $V_d$ in the fifth and sixth columns of the table for deflections in all directions in a plane.

In order to provide for tracing around a pattern in a reverse direction, the phase displacement of the dephased voltage $V_d$ is controlled so that it shifts in the opposite direction, i. e., so that it becomes increasingly lagging with respect to the resultant voltage $V_r$ in response to increases in the magnitude of the resultant voltage. This is accomplished by initially saturating the reactor and utilizing the resultant voltage $V_r$ to desaturate the reactor as it increases in magnitude. For initially saturating the reactor, an additional saturating winding 48c is provided which opposes the saturation control winding 48b. This opposing saturating winding 48c is excited from a suitable D.-C. source such as a battery 52 when the switch 53 is closed. This initial saturation which is produced by the opposing saturating winding 48c produces an initial 180° phase shift of the dephased voltage $V_d$ with respect to the resultant voltage $V_r$ which is undesirable. On the other hand, it is desirable that the voltages $V_d$ and $V_r$ shall be substantially in phase at approximately zero deflection of the tracer element and accordingly a reversing switching means 54 is provided for reversing the phase of the dephased voltage $V_d$ after the initial 180° phase shift. With the foregoing arrangement, the phase displacement of the dephased voltage $V_d$ becomes increasingly lagging with respect to the resultant voltage $V_r$ in response to increases in the magnitude of the resultant voltage.

The dephased voltage $V_d$ is amplified by a suitable amplifier 55 which is preferably identical with the amplifier 42 of Fig. 5. The amplified voltage $V_d$ appears across the terminals of the secondary winding of the output transformer 56.

By means of a bridge circuit comprising the adjustable resistor 57 and a capacitor 58 connected as adjacent arms of the bridge and the portions of the secondary winding of the transformer 56 on opposite sides of the grounded center tap as the other two arms, two quadrature control alternating voltages $V_e$ and $V_f$ are derived from the dephased voltage $V_d$. The voltage $V_f$ across the lower half of the secondary winding of the transformer is in phase with the dephased voltage $V_d$. The values of the resistor 57 and capacitor 58 are so chosen that the voltage $V_e$ between the center tap of the secondary winding of the transformer 56 and the common connection 57a of the resistor and capacitor lags the dephased voltage $V_d$ by 90° for all deflections of the tracer element. These relationships are illustrated by the vectors $V_e$ and $V_f$ in the seventh column of the table under the heading "Phase of $V_e$ and $V_f$."

The voltages $V_\epsilon$ and $V_e$ are amplified by suitable amplifiers 59 and 60 respectively. These amplifiers are preferably identical with the amplifier 42 of Fig. 5. The amplified voltages $V_\epsilon$ and $V_e$ appear across the terminals of the secondary windings of the amplifier output transformers 61 and 62 respectively.

For the purpose of providing two D.-C. control voltages which vary respectively as the cosine and sine of the phase displacement between the dephased voltage $V_d$ and the reference voltage $V_0$, two electric valve type translator units 63 and 64 are provided.

The translator unit 63 comprises a twin triode electric valve 65 of which the anode-cathode circuits are supplied from the opposed secondary windings 66a and 66b of the anode transformer 66 of which the primary winding 66c is supplied with the alternating reference voltage $V_0$ of the oscillator 26. Since the anode-cathode circuits of both paths of the valve 65 are supplied from opposed secondary windings, the voltages of the anodes 65a and 65b have instantaneous reverse polarities, i. e., when the voltage of either anode is positive, the voltage of the other is negative.

When the dephased voltage $V_d$ is in phase with the reference voltage $V_0$, the control voltage $V_f$ which is in phase with the dephased voltage $V_d$ is also in phase with the reference voltage $V_0$. During the half cycle in which the voltage of the anode $65a$ is positive, the voltages of both grids are negative and both paths of valve 65 are non-conducting. During the next half cycle in which the voltage of the anode $65b$ is positive, the grid voltage is positive and current flows in the right hand conducting path and produces a voltage drop across resistor 68 of which the polarity is indicated in the drawing by plus and minus signs. Since the voltage of the anode $65a$ is negative, no current flows in the left hand conducting path to produce an opposing voltage drop across the resistor 67. Thus, for zero phase displacement between the dephased voltage $Vd$ and the reference voltage $V_0$, the net direct voltage $V_{1\,D.-C.}$ across the output terminals is maximum. This maximum value of the direct voltage $V_{1\,D.-C.}$ is represented by the ordinate of the point $69a$ of Fig. 6 in which ordinates represent the magnitude of the D.-C. output voltages of the translator unit and the abscissae represent phase displacement between the dephased voltage $Vd$ and the reference voltage $V_0$. With the voltage $Vd$ lagging the reference voltage 45°, the grid voltage does not become positive at the beginning of the half cycle in which the voltage of the anode $65b$ is positive and consequently the right hand path does not conduct for the full half cycle. In addition, the grid voltage remains positive for a portion of the cycle in which the anode $65a$ is positive and the left-hand path becomes conducting for a short time during the portion of the half cycle in which the anode $65a$ is positive. As a result, the net direct voltage across the output terminals is diminished. Its magnitude is represented in Fig. 6 by the ordinate $69b$. When the voltage $Vd$ lags the reference voltage $V_0$ 90°, each path of the valve conducts during one-half of the half cycle in which its anode voltage is positive. Thus both paths conduct equal amounts and produce equal opposing voltage drops across the resistors 67 and 68 so that the direct voltage $V_{1\,D.-C.}$ across the terminals $63a$ and $63b$ is zero. This zero voltage magnitude is represent by the zero ordinate $69c$. If the voltage $Vd$ lags the reference voltage 180°, the polarities of the grid voltages with respect to the anode voltages are exactly reversed from the polarities that existed when the voltage $Vd$ was in phase with the reference voltage. Consequently, the left hand path conducts during the full half cycle in which its anode voltage is positive and the right hand path is non-conducting. Thus the net voltage $V_{1\,D.-C.}$ across the output terminals is maximum and its polarity is reversed, i. e., the terminal $63b$ is positive and the terminal $63a$ is negative. This is represented by the ordinate of the point $69d$.

From the foregoing, it is seen that as the phase displacement of the dephased voltage $Vd$ with respect to the reference voltage $V_0$ is varied through 360°, there is produced across the output terminals $63a$ and $63b$ of the translator unit a direct voltage $V_{1\,D.-C.}$ of which the magnitude and polarity vary as the cosine of the phase displacement between the dephased voltage and the reference voltage.

The translator unit 64 is in all respects like translator unit 63. The reference voltage $V_0$ is supplied to the anodes through a transformer 70 having opposed secondary windings $70a$ and $70b$ and the component voltage $Ve$ which lags the component voltage $Vf$ 90° is supplied to the grids. Consequently, there appears at the output terminals $64a$ and $64b$ a direct voltage $V_{2\,D.-C.}$ of which the magnitude and polarity vary in a manner similar to that of the voltage $V_{1\,D.-C.}$ as illustrated by the curve 71 of Fig. 6. However, since the voltage $Ve$, which is supplied to the grids is in quadrature with respect to the voltage $Vf$ which is supplied to the grids of the translator unit 63, the magnitude variation of the voltage $V_{2\,D.-C.}$ lags the magnitude variation of the voltage $V_{1\,D.-C.}$ 90° as illustrated in Fig. 6 in which the curve 71 is shown 90° lagging the curve 69. In other words, the direct voltage $V_{2\,D.-C.}$ which appears at the output terminals varies as the sine of the phase displacement of dephased voltage $Vd$ with respect to the reference voltage $V_0$.

The two control direct voltages $V_{1\,D.-C.}$ and $V_{2\,D.-C.}$ are utilized to control the operation of the motors 6 and 11 respectively which produce the components of the relative movements between the tracer element and the pattern and between the cutting tool and the work piece.

A voltage proportional to the speed of motor 6 is generated by means of a tachometer generator 72 which is driven by the motor 6. The difference between the voltage $V_{1\,D.-C.}$ and the voltage proportional to the speed is amplified by means of a balanced push-pull D.-C. amplifier comprising electric valves 73 and 74, and the amplified difference voltage appears across the output terminals of the amplifier and is supplied across the series connected resistors 75 and 76. These resistors 75 and 76 are connected in the grid voltage phase shifting circuit of a pair of thyratrons 77 and 78 which are supplied from a suitable alternating voltage source 79. The thyratrons 77 and 78 supply a half wave rectified voltage to the armature of the motor 6 through one or the other of the split series field windings $6a$ and $6b$ to provide for rotation in a forward or reverse direction depending upon the polarity of the voltage $V_{1\,D.-C.}$ and at a speed proportional to its magnitude.

Similarly, a voltage proportional to the speed of the motor 11 is produced by a tachometer generator 80 and the difference between this voltage and the voltage $V_{2\,D.-C.}$ is amplified by means of a D.-C. push-pull amplifier comprising the electric valves 81 and 82. The difference voltage is utilized to control the thyratrons 83 and 84 to supply current to the armature of the motor 11 through one or the other of the split field windings $11a$ and $11b$ to provide for rotation of the motor in a forward or reverse direction, depending upon the polarity of the voltage $V_{2\,D.-C.}$ and at a speed proportional to its magnitude.

Since the speeds of the motors 6 and 11 vary in accordance with the magnitudes and polarities of the controlled direct voltages $V_{1\,D.-C.}$ and $V_{2\,D.-C.}$, the ordinates of the curves 69 and 71 also represent the speeds of the motors 6 and 11 respectively.

The operation of the system is as follows: Assuming that it is desired to have the tracer follow the outline of the pattern in a counterclockwise direction, switch 53 is left open and the reversing switch 54 is moved to its upper closed position in which the movable switch contacts are in engagement with the upper and middle stationary contacts. The pattern to be traced is illustrated in Fig. 7 as an inside circular pattern 85. It may be assumed that the tracer tip $24a$ is out of contact with the pattern as indicated by the position of the small full line circle $24a$ in Fig. 7, so that the tracer element is undeflected and the system is at rest. The system is energized to bring the tracer tip into contact with the pattern by deflecting the tracer element very slightly toward the left. This is accomplished, for example, by a slight manual pressure on the tracer element at a point above the tracer tip. The resulting operating condition is most nearly represented by the values of the various operating characteristics indicated in the first horizontal row of the table of Fig. 9. However, the deflection required is much smaller than the .5 unit deflection indicated in the first row. As a result of this smaller deflection, the resultant voltage V$r$ is correspondingly smaller and the phase displacement of the dephased voltage V$d$ with respect to the reference voltage V$o$ is approximately zero degrees. At very small phase displacements of the voltage V$d$ with respect to the voltage V$o$, as illustrated in Fig. 6, the speed of the motor 11 is zero and the motor 6 is energized for rotation in a direction to move the table to the left. The relative movement of the tracer element and the pattern is the same as if the tracer were being moved to the right. When contact between the tracer tip and pattern is established as indicated by the dotted line circle 24a tangent to the pattern at the position A, the deflection of the tracer element to the left is increased, thereby to increase the magnitude of the resultant voltage V$r$ and to shift the phase of the voltage V$d$ in a positive sense or in a counter-clockwise direction vectorially. When the deflection increases to 1.0 unit, the operating characteristics have the values shown in the third horizontal row of the table in Fig. 9. The voltage V$d$ is displaced 90° in phase from the reference voltage V$o$. As shown in Fig. 6, at 90° phase displacement of the voltage V$d$, the speed of the motor 6 is zero and motor 11 is operating at full speed in a direction to move the tracer element toward the rear of the pattern as indicated by the vector 86a at position A and by the vector in the third horizontal row under the heading "Direction of relative movement." As the movement of the tracer continues in the direction indicated by the vector 86a, the deflection of the tracer element to the left is slightly increased owing to the curvature of the pattern. This causes the resultant voltage V$r$ to increase thereby increasing the phase displacement of the voltage V$d$ beyond 90° positive. As a result, the speed of the motor 11 is diminished slightly and the motor 6 is energized for operation at a very slow speed in the reverse direction, i. e., in a direction to move the table to the right as shown by the curve 69 in Fig. 6. The direction of the relative movement is indicated by the vector 86a'. The change in the direction of relative movement permits the deflection to decrease to 1.0 unit. This tends to allow the phase displacement of the voltage V$d$ with respect to voltage V$o$ to decrease again to 90°. However, this tendency is counteracted by the increased phase displacements of the voltages V$r$ and V$d$ with respect to voltage V$o$ as a result of the change in direction of the deflection of the tracer element at its new position on the pattern and thus the relative movement continues in the direction of the vector 86a'.

As it progresses along the outline of the pattern, the curvature of the pattern again increases the deflection beyond 1.0 unit. The magnitude of the resultant voltage V$r$ also increases beyond 1.0 unit and the phase displacement of the dephased voltage V$d$ is again further increased. The speed of the motor 6 in the reverse direction is still further increased and that of the motor 11 still further diminished. The direction of the relative movement is thus shifted further to the left as indicated by the vector 86a''. Thus the control in responding to maintain the deflection of the tracer element constant at 1.0 unit continuously varies the direction of the relative movement as it progresses along the contour of the pattern.

At position B, the direction of the deflection is indicated by the vector 86b and also by the vector in the fourth horizontal row in the table of Fig. 9 under the heading "F direction." For this direction of the deflection, the phase displacement of the voltage V$d$ with respect to the reference voltage V$o$ is 135° as shown in the fourth row under the heading V$d$. At this phase displacement, the motor 6 rotates at .707 full speed in the reverse direction, i. e., in a direction to move the table toward the right, and the motor 11 rotates at .707 full speed in a direction to move the tracer element toward the rear of the pattern so that the relative movement is in a direction represented by the vector 86b in Fig. 7.

The speed of the relative movement is constant for all angles, i. e., at all points on the contour of the pattern. The reason for this constancy is that at any angle of deflection of the tracer element and thus at any phase displacement of the voltage V$d$ with respect to the reference voltage V$o$, the velocity of the relative movement is made up of two relatively perpendicular components of which one is proportional to the sine and the other is proportional to the cosine of the angle of the relative movement.

(1) $$\sin^2 + \cos^2 = 1$$

or (2) $$\sqrt{\sin^2 + \cos^2} = 1$$

which is a constant. As shown by Fig. 6, the velocity of the longitudinal component V$L$ is proportional to the cosine and the velocity of the transverse component V$t$ is proportional to the sine. Therefore, (3) $$\sqrt{V_L^2 + V_T^2} = \text{a constant}$$

and since the resultant velocity $$V = \sqrt{V_L^2 + V_T^2}$$

therefore V equals a constant. In other words, the relative velocity of the tracer element and the pattern and the relative velocity of the cutter and the work piece are constant for all angles of such movement along the path of the contour of the pattern.

The direction of the deflection of the tracer element and of the resulting relative movement of the tracer and pattern for successive 45° positions throughout the 360° of the closed path of the pattern are illustrated in Fig. 7 and are shown in the successive horizontal rows in the table of Fig. 9 under the heading "Direction of relative movement." The tracing movement around the pattern will be repeated until the switch 87 is opened to remove power from the control system.

If it is desired to trace the pattern in the opposite direction, the switch 53 is closed and the switch 54 is moved to the reverse position, i. e., to the lower position in which the movable contacts engage the lower middle stationary contacts. As pointed out in the foregoing, this causes the phase of the dephased voltage V$d$ to shift in a negative sense, i. e., in a clockwise direction vectorially in response to an increase in the magnitude of the deflection of the tracer element and the resulting increase in the voltage V$r$. Consequently, in the position A at 1.0 unit deflection, the voltage V$d$ lags the reference voltage V$o$ 90° as shown by the curve 71 at minus 90°, the speed of the motor 6 is zero and the motor 11 rotates at full speed in a reverse direction, i. e., in a direction to move the tracer element toward the front of the pattern. Thus, the tracing operation is started and continues in a clockwise direction.

The control system will cause the tracer to follow an outside pattern as well as the inside pattern of Fig. 8.

Frequently, it is desired to control certain operations of the control system manually. For example, when the tracer is not in contact with the pattern, it may be desirable to control the initial approach of the tracer to the pattern by means of a manually operated control device and to transfer the control from "manual," to "automatic" when the tracer makes contact with the pattern. It may also be desirable to provide for terminating the automatic control and moving the tracer out of contact with the pattern by manual conrol.

As pointed out in the foregoing, during automatic operation when the tracer is in contact with the pattern, the relative movement of the tracer and pattern is produced in response to the voltage Vd. The direction of such relative movement depends on the phase displacement between the voltage Vd and the reference voltage Vo. Manual control is accomplished by substituting for the voltage Vd a voltage of which the phase with respect to the voltage Vo is controlled by a manually operated control device. For this purpose suitable phase control means are provided for deriving from the reference voltage Vo a voltage of which the phase varies in response to the rotation of a manually operated knob 88. This phase control means comprises a Selsyn 89 and a bridge network 90 for supplying to the polyphase stator winding 89a of the Selsyn two alternating voltages displaced in phase from each other by 120 degrees. These two voltages produce a three phase excitation of the stator winding which in turn produces a rotating magnetic field. This rotating magnetic field induces an alternating voltage Vg in the rotor winding 89b of the Selsyn. The voltage Vg is supplied to the control system through the normally closed contacts 91b of a transfer control relay 91 at a point between the switch 54 of Fig. 1a and the amplifier 55 of Fig. 1b.

The phase of voltage Vg with respect to the reference voltage Vo can be shifted through 360 electrical degrees as the rotor winding 89b of the Selsyn is rotated through 360 mechanical degrees. By substituting the voltage Vg of which the phase is controlled manually in place of the automatic control voltage Vd, the direction of the feed, i. e., the direction of the relative movement between the tracer and the pattern can be controlled for any desired direction by adjusting the knob 88 until the desired direction of feed is indicated on the dial 92 which is calibrated in terms of direction of feed.

For the purpose of transferring the control from manual to automatic when the tracer makes contact with the pattern, suitable means are provided which are illustrated as comprising a twin triode electric valve 93 for controlling the energization of the operating coil 91a, of the transfer relay 91.

The grid cathode circuit of the left hand conducting path of the electric valve 93 is connected across the resistor 94 which is connected in series with the saturating winding 48b of the reactor 48 of Fig. 1a.

When the tracer element is not contacting the pattern, the voltage Vr is substantially zero. Therefore, at this time the direct current through the ammeter A and the resistor 94 is substantially zero and consequently the voltage drop across the resistor 94 is substantially zero. When the tracer is in contact with the pattern and has a deflection of 1.0 unit, the amplitude of voltage Vr is sufficient to produce a voltage drop across resistor 94 of the order of 100 volts. As the voltage across the resistor 94 increases, the voltages of the grids 93a and 93b of both paths of the valve 93 become more positive. The cathode 93c of the left hand conducting path of the valve 93 is so biased that a direct voltage in excess of 5 volts across resistor 94 will increase the anode current in the left hand path to a value which is sufficient to pick up the transfer relay 91. This relay in picking up opens its normally closed contacts 91b and closes its normally open contacts 91c thereby to interrupt the supply of the manually controlled voltage Vg to the control system and to complete the supply of the automatically controlled voltage Vd to the system. From this point on, the automatic operation is identical with the automatic operation described in the foregoing portions of the specification.

A manually operated switching device 95 is included in series with the operating coil 91a of the transfer relay 91 and in parallel with the left hand conducting path of the valve 93. If the switch 95 is closed, the relay 91 will be energized and its normally open contacts 91c will be closed and thus the control will always be in a condition for automatic operation irrespective of the deflection of the tracer. If the deflection of the tracer is zero, the feed will likewise be zero. However, when the switch 95 is open and the deflection of the tracer is zero, i. e., the tracer is not in contact with the pattern, the control is on "manual" and the direction of the feed is determined by the setting of the dial 92. If the tracer is in contact with the pattern or if it is deflected by any means, such for example as manual pressure, the deflection causes the resultant voltage Vr to increase, thereby energizing the relay 91 to switch the control from manual to automatic, and the tracer begins to follow the contour of the pattern in accordance with the automatic operation described in the foregoing.

If, during the automatic tracing operation, it is desired to cause the tracer to feed away from the edge of the pattern, this is accomplished by setting the manual control dial 92 for the desired direction of feed away from the pattern and depressing the push button switch 96. In response to the separation of the normally closed contacts of the push button switch 96, the transfer relay 91 is deenergized and drops out to open the normally open contacts 91c and close the normally closed contacts 91b, thereby to transfer the control from automatic to manual. This causes the tracer to feed away from the pattern in the direction which is set on the dial 92.

A careless operator may accidentally set the dial 92 to cause the tracer to feed in instead of away from the work. This would result in damage to the tracer and the work piece in the milling machine. Such unintended operation is prevented by means of an automatic disconnect device comprising a relay 97 in the anode circuit of the right hand conducting path of the valve 93 and a relay 98 under the control of the relay 97. If the tracer accidentally feeds in toward the pattern instead of away therefrom the resultant voltage Vr increases beyond its normal value of 1.0 unit and the voltage across the resistor 94 increases until the anode current in the right hand conducting path of valve 93 is sufficient to pick up the relay 97. In picking up, relay 97 closes its contacts 97a to connect the operating coil 98a of the relay 98 across the source 99 in parallel with the operating coil 97b of relay 97 in the anode circuit of valve 93. In response to energization, relay 98 picks up to open its normally closed contacts 98b thereby to deenergize and open a contactor (not shown) between the source 79 and the motors 6 and 11. In response to the opening of this contactor, the motors 6 and 11 are disconnected from the source 79 thereby stopping the motors and preventing damage to the tracer and work.

The interlocking circuit through the operating coils of the relays 97 and 98 remains energized even though the force on the tracer is removed and the valve 93 ceases conducting, since the operating coils are connected in a parallel circuit across the source in series with each other and a resistor 100.

For the purpose of resetting the safety circuit, a push button switch 101 is included in the circuit of the operating coils of the relays 97 and 98.

Although in accordance with the provisions of the patent statutes this invention is described as embodied in concrete form and the principle thereof has been explained together with the best manner in which it is now contemplated applying that principle, it will be understood that the apparatus shown and described is merely illustrative and that the invention is not limited thereto since alterations and modifications will readily suggest themselves to persons skilled in the art without departing from the true spirit of the invention or from the scope of the annexed claims.

What I claim as new and desire to secure by Letters Patent of the United States is:

1. A control system comprising in combination, a movable element having an initial position, a driven member, driving means for said member, a source of reference alternating voltage, means responsive to deflection of said element from said initial position for producing a first control alternating voltage having a magnitude proportional to the deflection of said element and a phase relationship with respect to said reference voltage that varies continuously with the direction of said deflection, means responsive to said control voltage for producing a dephased alternating voltage having a phase displacement with respect to said control voltage that varies continuously with the magnitude of said control voltage, and means responsive to said dephased voltage for energizing said driving means to drive said driven member in a direction corresponding to the phase of said dephased voltage.

2. A control system comprising a movable element having an initial position, a driven member, driving means for said member, a source of reference alternating voltage, means responsive to deflection of said element from said initial position for producing a first control alternating voltage having a magnitude proportional to said deflection and a phase relationship with respect to said reference voltage that varies continuously with the direction of said deflection, a phase shifting network for deriving from said control alternating voltage a second alternating voltage displaced in phase from said control alternating voltage by an amount that varies continuously in proportion to the magnitude of said control alternating voltage, and means responsive to said second alternating voltage for energizing said driving means for operation at a speed having a predetermined relationship to the phase displacement of said second alternating voltage.

3. A control system comprising a movable element having an initial position, a driven member, a source of reference alternating voltage, driving means for said member, means responsive to deflection of said element from said initial position for producing an alternating control voltage having a magnitude of effective value proportional to said deflection and a phase relationship with respect to said reference voltage that varies continuously with the direction of said deflection, means responsive to said control voltage for producing a dephased alternating voltage having a phase displacement with respect to said control voltage that varies continuously in proportion to said magnitude of said control voltage, and means responsive to said dephased voltage for energizing said driving means for operation in a direction dependent upon the direction and magnitude of said deflection.

4. A control system comprising a movable armature member of magnetic material having an initial position, a pair of driving means, a pair of bridge circuits having reactance arms in inductive relationship with said armature member for producing alternating output voltages dependent upon the magnitude and direction of deflection of said armature member from said initial position, electrical connections for combining said output voltages into a resultant voltage, a reactance phase shifting circuit responsive to said resultant voltage for producing a dephased alternating voltage having a phase displacement with respect to said resultant voltage that varies continuously with the magnitude of said resultant voltage, a circuit having resistance and reactance elements for deriving from said dephased voltage two alternating voltages in quadrature, each for controlling the energization of a different one of said driving means to control its direction and speed.

5. A control system comprising a source of reference alternating voltage, a movable element having an initial position, a pair of driving means, means responsive to deflection of said element from said initial position for producing a second alternating voltage having a magnitude dependent upon the magnitude of said deflection, means responsive to said second voltage for producing a dephased alternating voltage having a phase displacement with respect to said second voltage dependent on the magnitude of said second voltage, and means responsive to said dephased voltage for energizing both of said driving means for operation at speeds having cosine and sine relationships respectively to the angle of phase displacement between said dephased voltage and said reference voltage.

6. A control system comprising a source of reference alternating voltage, a movable element having an initial position, a pair of driving means, means responsive to deflection of said element from said initial position for producing a second alternating voltage having a magnitude dependent upon the magnitude of said deflection and having a phase displacement with respect to said reference voltage corresponding to the direction of said deflection, means responsive to said second voltage for producing a dephased alternating voltage having a phase displacement with respect to said second voltage dependent on the magnitude of said second voltage, and means responsive to said dephased voltage for energizing both of said driving means for operation at speeds having cosine and sine relationships respectively to the angle of phase displacement between said dephased voltage and said reference voltage.

7. A control system comprising a source of reference alternating voltage, a movable element having an initial position, means responsive to deflection of said element from said initial position for producing a second alternating voltage having a magnitude dependent upon the magnitude of said deflection, means responsive to said second voltage for producing a dephased alternating voltage having a phase displacement with respect to said second voltage dependent on the magnitude of said second voltage, means responsive to said dephased voltage for producing two direct voltages varying in magnitude and polarity approximately as the sine and cosine respectively of the phase angle between said dephased voltage and said reference voltage, and a pair of driving means separately energized in response to said direct voltages for operation at speeds varying in magnitude and direction with the magnitude and polarity of said direct voltages.

8. A control system comprising a source of reference alternating voltage, a movable element having an initial position, a pair of driving means, means responsive to deflection of said element from said initial position for producing two component alternating voltages having predetermined magnitude and phase relationships to the magnitude and directions of two components of said deflection, means responsive to the resultant of said two component voltages for producing a dephased alternating voltage having a phase displacement with respect to said resultant voltage dependent on the magnitude of said resultant voltage, and means responsive to said dephased voltage for energizing both said driving means for operation at speeds varying substantially as the sine and cosine respectively of the angle of phase displacement between said dephased voltage and said reference voltage.

9. A control system comprising a source of reference voltage, a control element having an initial position and mounted for movement from said position in any direction in a plane, means responsive to two relatively perpendicularly disposed component of a deflection of said element from said initial position for producing two control alternating voltages having phase relationships with respect to said reference voltage dependent upon the direction of said deflection, means for combining said voltages to produce a resultant voltage, means responsive to said resultant voltage for producing a dephased alternating voltage having a phase displacement with respect to said resultant voltage dependent upon the magnitude of said resultant voltage, means responsive to said dephased voltage for producing two direct voltages varying in magnitude and polarity approximately as the sine and cosine respectively of the phase angle between said dephased voltage and said reference voltage, and a pair of driving means separately energized in response to said direct voltages for operation at speeds varying in magnitude and direction with the magnitude and polarity of said direct voltages.

10. A control system comprising a source of reference alternating voltage, a movable element having an initial position, means responsive to deflection of said element from said initial position for producing a second alternating voltage having a magnitude dependent upon the magnitude of said deflection, means responsive to said second voltage for producing a dephased alternating voltage having a phase displacement with respect to said second voltage dependent on the magnitude of said second voltage, means responsive to said dephased voltage for producing two quadrature alternating voltages having predetermined phase relationships to said dephased voltage, electric valve means responsive to said quadrature voltages for producing two direct voltages varying in magnitude and polarity approximately as the sine and cosine respectively of the phase angle between said dephased voltages and said reference voltage, and a pair of driving means separately energized in response to said direct voltages for operation at speeds varying in magnitude and direction with the magnitude and polarity of said direct voltages.

11. A control system comprising a source of reference alternating voltage, a movable element having an initial position, a pair of driving means, means responsive to deflection of said element from said initial position for producing a second alternating voltage having a magnitude dependent upon the magnitude of said deflection, a phase shifting circuit responsive to said second voltage for producing a dephased alternating voltage having a phase displacement with respect to said second voltage dependent on the magnitude of said second voltage comprising a saturable reactor having a saturation control winding and a reactance winding, connections for supplying said second voltage to said reactance winding, and rectifying means supplied from said second voltage for supplying to said saturating winding a unidirectional current proportional to the magnitude of said second voltage, and means reponsive to said dephased voltage for energizing both of said driving means for operation at speeds having cosine and sine relationships respectively to the angle of phase displacement between said dephased voltage and said reference voltage.

12. A control system comprising in combination a source of reference alternating voltage, a movable control element having an initial position, driving means, means responsive to deflection of said element from said initial position for producing a control alternating voltage having a magnitude that varies with the magnitude of said deflection and having a predetermined phase relationship with respect to said reference voltage, a phase shifting circuit responsive to said control voltage for producing a dephased alternating voltage having a phase displacement with respect to said control voltage dependent upon the magnitude thereof comprising a saturable core reactor having a reactance winding connected to be supplied from said control voltage and a control winding, and a rectifier supplied from said control voltage for supplying to said control winding a unidirectional current proportional to the magnitude of said control voltage, and means responsive to said dephased alternating voltage for energizing said driving means for operation in a direction corresponding to the phase displacement between said dephased voltage and said reference voltage.

13. A control system comprising in combination a source of reference alternating voltage, a movable control element having an initial position, driving means, means responsive to deflection of said element from said initial position for producing a control alternating voltage having a magnitude that varies with the magnitude of said deflection and having a predetermined phase relationship with respect to said reference voltage, a phase shifting circuit responsive to said control voltage for producing a dephased alternating voltage having a phase displacement with respect to said control voltage dependent upon the magnitude thereof comprising a saturable core reactor having a reactance winding connected to be supplied from said control voltage, a separately excited saturating winding and an opposing saturation control winding, and a rectifier supplied from said control voltage for supplying to said saturation control winding a unidirectional current proportional to the magnitude of said control voltage, switching means for reversing the phase of said dephased voltage, and means responsive to said dephased voltage for energizing said driving means for operation in a direction corresponding to the phase displacement between said dephased voltage and said reference voltage.

NORMAN G. BRANSON.

REFERENCES CITED

The following references are of record in the file of this patent:

UNITED STATES PATENTS

| Number | Name | Date |
|---|---|---|
| 1,586,233 | Kaempfe | May 25, 1926 |
| 1,998,939 | Mittag | Apr. 23, 1935 |
| 2,025,748 | Howe | Dec. 31, 1935 |
| 2,027,140 | Alexanderson | Jan. 7, 1936 |
| 2,074,396 | Howe | Mar. 23, 1937 |
| 2,116,593 | Bouvier | May 10, 1938 |
| 2,307,503 | Gulliksen | Jan. 5, 1943 |
| 2,310,955 | Hornfeck | Feb. 16, 1943 |
| 2,363,342 | Lesnick | Nov. 21, 1944 |

FOREIGN PATENTS

| Number | Country | Date |
|---|---|---|
| 489,271 | Great Britain | Aug. 25, 1938 |
| 505,470 | Great Britain | May 11, 1939 |

Certificate of Correction

Patent No. 2,492,731                      December 27, 1949

NORMAN G. BRANSON

It is hereby certified that errors appear in the printed specification of the above numbered patent requiring correction as follows:

Column 8, lines 46 and 49, for "$V_\epsilon$" read $V_f$; column 13, line 21, for "conrol" read *control*;

and that the said Letters Patent should be read with these corrections therein that the same may conform to the record of the case in the Patent Office.

Signed and sealed this 4th day of July, A. D. 1950.

[SEAL]

THOMAS F. MURPHY,
*Assistant Commissioner of Patents.*